(12) United States Patent
Mbadinga Mouanda et al.

(10) Patent No.: US 11,828,212 B2
(45) Date of Patent: Nov. 28, 2023

(54) VALVE WITH VALVE BODY, AND CRANKCASE VENTILATION DEVICE

(71) Applicant: MANN+HUMMEL GmbH, Ludwigsburg (DE)

(72) Inventors: Gelase Mbadinga Mouanda, Sachsenheim (DE); Thomas Jessberger, Asperg (DE); Volker Kuemmerling, Bietigheim-Bissingen (DE); Lukas Bock, Bietigheim-Bissingen (DE); Claus Fischer, Fellbach (DE); Thomas Schleiden, Oberstenfeld (DE); Tobias Warth, Winnenden (DE); Matthias Teschner, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 219 days.

(21) Appl. No.: 17/392,915

(22) Filed: Aug. 3, 2021

(65) Prior Publication Data
US 2021/0363902 A1 Nov. 25, 2021

Related U.S. Application Data

(63) Continuation of application No. PCT/EP2020/052037, filed on Jan. 28, 2020.

(30) Foreign Application Priority Data

Feb. 4, 2019 (DE) ..................... 10 2019 102 729.2

(51) Int. Cl.
*F01M 13/00* (2006.01)
*F16K 15/02* (2006.01)
(Continued)

(52) U.S. Cl.
CPC ....... *F01M 13/0011* (2013.01); *F16K 15/023* (2013.01); *F16K 15/141* (2013.01); *F16K 25/005* (2013.01)

(58) Field of Classification Search
CPC .. F16K 15/023; F16K 15/141; F01M 13/0011
See application file for complete search history.

(56) References Cited

U.S. PATENT DOCUMENTS 3,356,103 A 12/1967 Biello et al.
3,513,875 A * 5/1970 Nelson ..................... F16K 7/00
137/533.19
(Continued)

FOREIGN PATENT DOCUMENTS

CA 2214740 A1 3/1999
CN 104864093 A 8/2015
(Continued)

*Primary Examiner* — Michael R Reid

(57) ABSTRACT

A valve has a valve housing with a valve seat and a valve body holder with a fluid-permeable flow opening. A valve body is arranged in the valve body holder and axially displaceable between an open state and a closed state of the valve. The valve body has an envelope surface with a sealing region for fluid-tightly contacting the valve seat in the closed state. It has a base region adjoining the sealing region in longitudinal direction. A cross section contour of the envelope surface increases monotonously from the sealing region to the base region. In the open state, an axial end of the base region contacts the valve body holder. The envelope surface has a weakened region connecting sealing region and base region to each other. The weakened region has a reduced stiffness along the longitudinal direction. The valve body is formed of a thermoplastic polyhalogen olefin.

14 Claims, 4 Drawing Sheets

(51) Int. Cl.
   *F16K 15/14*   (2006.01)
   *F16K 25/00*   (2006.01)

(56) References Cited

U.S. PATENT DOCUMENTS

| | | | | |
|---|---|---|---|---|
| 4,132,241 | A | * | 1/1979 | Iannelli .................. E03C 1/106 137/854 |
| 2005/0081922 | A1 | | 4/2005 | Beck |
| 2013/0126020 | A1 | | 5/2013 | Shin |
| 2017/0284244 | A1 | | 10/2017 | Bock et al. |
| 2018/0074527 | A1 | | 3/2018 | Kuemmerling et al. |

FOREIGN PATENT DOCUMENTS

| | | |
|---|---|---|
| CN | 204647411 U | 9/2015 |
| DE | 102004048386 A1 | 4/2006 |
| EP | 0674128 A2 | 9/1995 |
| EP | 1215427 A1 | 6/2002 |

\* cited by examiner

VALVE WITH VALVE BODY, AND CRANKCASE VENTILATION DEVICE

CROSS-REFERENCE TO RELATED APPLICATIONS

This application is a continuation application of international application No. PCT/EP2020/052037 having an international filing date of 28 Jan. 2020 and designating the United States, the international application claiming a priority date of 4 Feb. 2019 based on prior filed German patent application No. 10 2019 102 729.2, the entire contents of the aforesaid international application and the aforesaid German patent application being incorporated herein by reference.

BACKGROUND OF THE INVENTION

The invention concerns a valve, in particular for a crankcase ventilation device, with an envelope surface that comprises a sealing region for fluid-tight contact at a valve seat and a base region adjoining the sealing region, wherein the envelope surface monotonously increases from the sealing region to the base region. Moreover, the invention concerns a crankcase ventilation device itself.

The invention will be disclosed in the following based on the example of its use in an internal combustion reciprocating piston engine.

In such internal combustion engines, it is not possible to achieve a complete sealing action at the piston rings between the piston and the cylinder wall. The requirement of a low friction between these components and the requirement of a sealing action as complete as possible between them are contrary. A compromise must be found between these two requirements. This means that no complete sealing action can be achieved. Oil-containing leakage gas (so-called "blow-by") can thus bypass the piston and reach the crankcase. In this context, in principle three different paths for escape of the leakage gas can be differentiated: On the one hand, the leakage gas can escape through gaps in the piston rings, on the other hand, it can escape between the piston ring and the cylinder wall, and, finally, between the piston ring and the piston. The oil-containing leakage gas that has escaped in such a way into the crankcase must now be supplied again to the combustion process. This is performed in closed crankcase ventilation devices (closed crankcase ventilation—CCV).

Such crankcase ventilation devices, depending on the field of application, can be constructed differently. In an exemplary embodiment of such a crankcase ventilation device, the oil-containing leakage gas is first guided into an oil separator in whose return line an oil return flow check valve can be arranged. This oil return flow check valve prevents that oil is accidentally sucked in (which could cause damages in the internal combustion engine). Moreover, further pressure regulating valves (for purified leakage gas) or other non-return check valves that are required for regulating the pressure in the crankcase can be provided downstream of the oil separator.

These different valves are typically embodied differently in regard to construction. They comprise typically also a different closure behavior, respectively. In this context, for an efficient crankcase venting action, a closing of the valves as early as possible already for very minimal vacuum values must occur and an oil drainage already at very low oil quantity weights.

SUMMARY OF THE INVENTION

It is therefore the object of the invention to efficiently design the venting action of a crankcase in a universal and simple manner.

This object is solved by a valve, in particular a valve for a crankcase ventilation device, with a valve seat and a valve body which are arranged in a valve housing, wherein the entire valve body is axially displaceable between an open state of the valve and a closed state of the valve, wherein the valve body comprises a thickened envelope surface that comprises a sealing region for fluid-tight contact at the valve seat and a base region adjoining in a longitudinal direction the sealing region, wherein a cross section contour of the envelope surface increases monotonously from the sealing region to the base region, wherein in the open state of the valve an axial end of the base region contacts a valve body holder that comprises at least one fluid-permeable flow opening, wherein the valve is characterized in that the sealing region is connected by means of a weakened region to the base region, wherein the weakened region comprises a reduced stiffness in relation to the longitudinal direction and wherein the valve body is formed of a thermoplastic plastic material, namely a polyhalogen olefin.

According to the invention, the object is solved by a valve with a valve seat and a valve body which are arranged in a valve housing. In this context, the entire valve body is axially displaceable between an open state of the valve and a closed state of the valve. In the open state of the valve, an axial end of the base region is contacting a valve body holder that comprises at least one fluid-permeable flow opening.

The valve body holder fulfills a threefold function in the valve. On the one hand, it serves for centering the valve body in relation to the valve seat. This enables, on the one hand, a permanent centering of the valve body in relation to the valve seat. On the other hand, it enables a centering of the valve body for all conceivable installation positions of the valve that comprises the valve body; centering can be achieved for vertical or horizontal or other installation positions in relation to the direction of the force of gravity. On the other hand, the valve body is secured against loss and reliably held within the valve.

Finally, due to the distance of the contact location of the valve body at the valve body holder in relation to the valve seat, the stroke of the valve body in the valve is also adjusted or determined. In this way, the opening and closing behavior of the valve can be influenced.

The at least one fluid-permeable flow opening of the valve body holder favors oil drainage and the flow of fluid through the valve.

The valve according to the invention can be used in a crankcase ventilation device for a plurality of functions. Preferably, it can be used universally for all valves that are provided in the crankcase ventilation device. These functions include in particular the use as a non-return check valve for partial load, non-return check valve for full load, non-return check valve for fresh air (PCV), and oil return flow check valve. Venting of a crankcase can be efficiently designed in a universal and simple manner.

The valve body which is employed in the valve according to the invention differs from the valve bodies with a rubber seal and a plastic ball which are typically employed in the example of a reciprocating piston internal combustion engine.

The valve body according to the invention comprises three functional regions which are provided in its geometric configuration. It is in particular suitable for a valve of a crankcase ventilation device.

The valve body comprises a thickened envelope surface which substantially forms the valve body and provides structure.

The sealing region serves for contact at the valve seat. This contact is configured fluid-tightly when the valve associated with the valve body is in a closed state. Additional components that are to effect the sealing action of the valve body against the valve seat are obsolete. A simple and inexpensive manufacture of the valve body and also of the associated valve is made possible.

The base region is arranged on a side of the sealing region which is facing away from the valve seat. For example, it can serve also for centering the valve body in the valve.

Finally, the weakened region connects the sealing region with the base region. In this weakened region, the material of the valve body is weakened in a targeted fashion, i.e., it exhibits a reduced stiffness in relation to the longitudinal direction.

According to the invention, the valve body is formed of a thermoplastic plastic material, namely a polyhalogen olefin. Polyhalogen olefins such as polytetrafluoroethylene comprise good chemical resistance and are suitable in particular for use in lubricant oil environments of internal combustion engines.

It is preferred that the described valve body is formed of a polytetrafluoroethylene, of polytetrafluoroethylene comprising fluoro and/or carbon and/or oxygen admixtures, or a thermoplastically processed polytetrafluoroethylene.

The reduced stiffness of the weakened region can be affected or determined at least partially by at least one material parameter of a valve body material, in particular by a modulus of elasticity of the valve body material that is reduced in the weakened region.

This can be realized, for example, by thermoforming or by a deep drawing process. Due to the targeted weakening of the region between the sealing region and the base region, intrinsic spring properties within the valve body can be achieved between the sealing region and the base region, which means in particular that a deformation in the weakened region in longitudinal direction is possible with reduced force expenditure compared to the sealing region and the base region. By utilizing these intrinsic spring properties obtained by the weakened region, a closure of the valve can be achieved already at very minimal vacuums. The valve will thus close as early as possible against lowest vacuums and open as early as possible against lowest oil quantity weights for drainage purposes.

The reduced switching pressures are achieved in detail in that for opening or closing of the valve it is not the entire valve body that must be "sucked" against a valve seat (closing direction) or "pushed off" from the valve seat (opening direction) but initially only the sealing region; this is particularly advantageously possible due to its flexible connection to the base region, particularly also for an intended flow in or opposite to the direction of gravity. This phenomenon is referred to in the further document as "second intrinsic stroke".

Further embodiments of the invention are disclosed in the dependent claims, respectively.

In this context, it is advantageous that the weakened region, at least in sections thereof, is embodied together with the sealing region and the base region to be free of material interruptions and embodied circumferentially in a circumferential direction of the sealing region.

The material interruption-free configuration of the valve body enables its simple and inexpensive manufacture. As a starting material for the valve body, a film (e.g. of polytetrafluoroethylene) can be used. The latter can be brought into the desired shape, for example, by deep drawing or thermoforming. In this context, in the same manufacturing step also the weakened region can be formed in that in the weakened region an increased heat input is realized in a targeted fashion and/or a comparatively high degree of forming is realized.

The formation of the weakened region can be realized completely about the circumference of the sealing region. In this way, an intrinsic springy region in the valve body is provided that enables a relative movement of sealing region to base region in an axial direction of the valve body. In this way, due to the valve body essentially a "second intrinsic stroke" is provided for the valve. Closure of the valve can be realized already at very minimal vacuums and, in reverse, opening of the valve already at very minimal oil quantity weights for drainage purposes.

It is also advantageous that the valve body at a side of the sealing region which is facing away from the weakened region comprises a first plateau region that is arranged parallel to a second plateau region between the weakened region and the base region.

In a closed state of the valve, the sealing region seals fluid-tightly in relation to the valve seat. The first plateau region blocks in this case the fluid passage through the valve seat. However, the sealing region can also take on at the same time a second function in this context. For example, it can project in its axial direction with an axial end—the first plateau region—at least partially into the opening of the valve seat in an open state of the valve. In this way, the sealing region at the same time also takes on a centering function for the valve body in the valve. The valve body comprises thus a defined initial position in relation to the valve seat. This enables, on the one hand, a permanent centering of the valve body in relation to the valve seat. On the other hand, it also enables centering of the valve body for all conceivable installation positions of the valve that comprises the valve body; centering can be achieved for vertical or horizontal or other installation positions in relation to the direction of the force of gravity.

The second plateau region forms in a closed state a contact surface for the valve seat. In this way, it can be prevented that the valve body even for high vacuums is "pulled through" the valve seat. Since the weakened region is however arranged between the first and the second plateau regions, the "second intrinsic stroke" of the valve body remains possible.

In this context, it is preferred that the valve body comprises at least a first pressure compensation opening that connects an inner side of the valve body with an outer side of the valve body and extends in a radial direction of the valve body from the weakened region across the second plateau region at least partially into the base region.

The first pressure compensation opening ("holes") serve for permeability of the valve body for fluid, for example, oil. They improve the oil drainage. At the same time however, the weight of the valve body can also be controlled due to the shape and the number of the first pressure compensation openings. In this way, it can be adjusted that the valve body already for very minimal vacuums is sucked in the direction toward the valve seat and the valve thus closes. In reverse, the valve thus opens also for very minimal oil quantity weights for drainage purposes. The first pressure compensation openings improve the drainage and reduce the pressure loss for a flow in the open state opposite to the blocking direction because in this way a larger flow cross section can be made available. The pressure compensation openings penetrate the thicker envelope surface of the valve body completely so that through them a secondary flow path can be provided in an open valve state.

Also, it is advantageous in this respect that the valve body comprises at least a second pressure compensation opening that connects the inner side with the outer side and is arranged between two neighboring first pressure compensation openings and extends in the radial direction from an axial end of the base region in the direction toward the second plateau region.

The second pressure compensation openings ("holes") serve for permeability of the valve body for fluid, for example, oil. They improve the oil drainage. At the same time however, the weight of the valve body can also be controlled due to the shape and the number of the second pressure compensation openings. In this way, it can be adjusted that the valve body already for very minimal vacuums is sucked in the direction toward the valve seat and the valve thus closes. In reverse, the valve thus opens also for very minimal oil quantity weights for drainage purposes. Due to an "alternating arrangement" of the first pressure compensation openings and of the second pressure compensation openings, a satisfactory material coverage of the second plateau can be ensured, on the one hand, and an improvement of flow and permeability properties can be achieved at the same time. Drainage is improved.

The valve body is to enable closure in the associated valve even for very minimal vacuum. For this purpose, the weight of the valve body must be designed and adapted in a targeted fashion. This can be achieved here by determining the material of the valve body. In this connection, the weight force of the valve body must be matched against the stiffness of the valve body. When the valve body is formed of a material that is too dense, it is too heavy in order to ensure an early and thus efficient closure of the valve even at very minimal vacuums. When the valve body is made of a material with a density that is too low, it will close at very minimal vacuum due to the minimal weight. However, the minimal density of the material of the valve body compromises its stiffness. In this case, for high vacuums, a plastic deformation of the valve body at the valve seat at closing of the valve would have to be provided due to the minimal density of the material. The valve body would be damaged which is to be avoided. The aforementioned materials are suitable for the geometry of the valve body for automotive applications at an internal combustion engine within the required temperature range of typically −40° C. to +150° C.

Furthermore, it is preferred in all this that a thickness of the cross section contour is embodied in a range of 1/10 mm to 1 mm, preferably in a range of 1/10 mm to 5/10 mm, particularly preferred in a range of 3/10 mm to 5/10 mm.

Finally, the object is also solved by a crankcase ventilation device that comprises at least one valve according to the invention.

The valve according to the invention can be used in the crankcase ventilation device for a plurality of functions. Preferably, it can be used universally for all valves provided in the crankcase ventilation device. These functions include in particular the use as non-return check valve for partial load, non-return check valve for full load, non-return check valve for fresh air (PCV) and oil return flow check valve. Venting of a crankcase housing can be efficiently designed in a universal and simple manner.

BRIEF DESCRIPTION OF THE DRAWINGS

Further advantages result from the following drawing description. In the drawings, embodiments of the invention are illustrated. The drawings, description, and claims contain numerous features in combination. A person of skill in the art will consider the features expediently also individually and combine them to expedient further combinations.

DESCRIPTION OF PREFERRED EMBODIMENTS

The Figures show only examples and are not to be understood as limiting.

Figure 1:
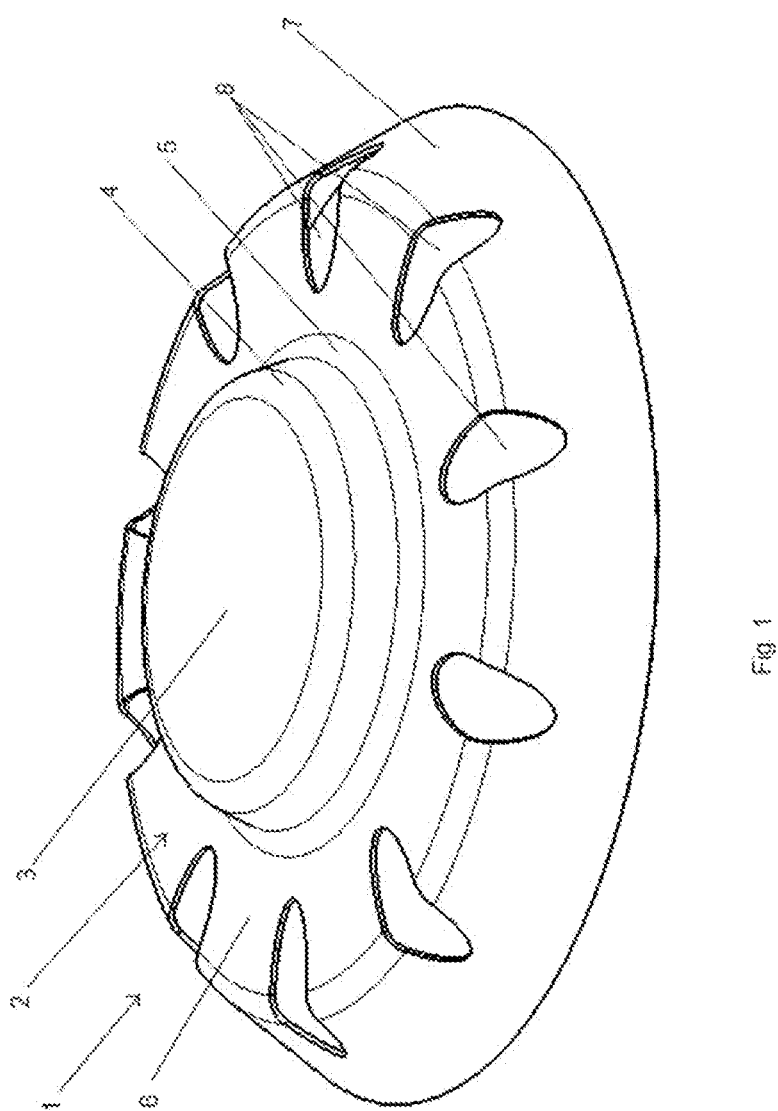
FIG. 1 shows an isometric illustration of a valve body of a valve according to the invention.

FIG. 1 shows a valve body 1 with an envelope surface 2 according to a first embodiment. The valve body 1 is divided into different regions.

The valve body 1 comprises a first plateau region 3 which is arranged at an axial end of the valve body 1. This first plateau region 3 is adjoined in the axial direction of the valve body 1 by a sealing region 4 that passes without material interruption into a weakened region 5. The weakened region 5, in turn, passes into a second plateau region 6. The second plateau region 6 is arranged parallel to the first plateau region 3. It continues in the axial direction of the valve body 1 into a base region 7. The envelope surface 2 monotonously decreases in the axial direction from the first plateau region 3 toward the base region 7. Furthermore, it can be seen that a plurality of first pressure compensation openings 8 are arranged at the valve body 1. In this context, the first pressure compensation openings 8 extend in a radial direction of the valve body 1 from the weakened region 5 across the second plateau region 6 at least partially into the base region 7. The first pressure compensation openings 8 connect an outer side of the valve body 1 with an inner side of the valve body 1.

Figure 2:
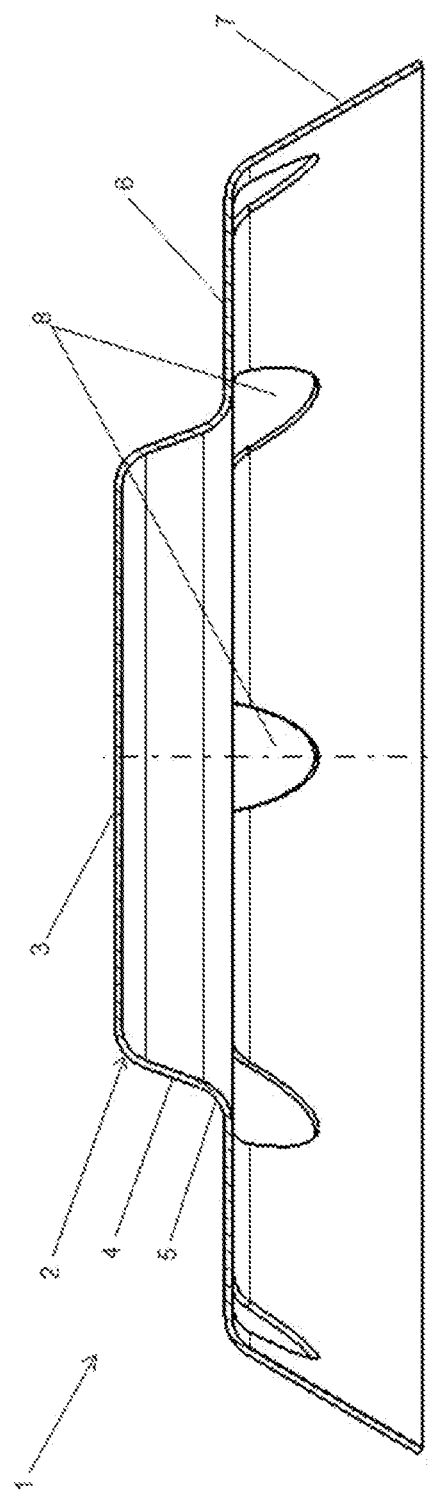
FIG. 2 shows a section illustration of the valve body of FIG. 1.

In FIG. 2, a section illustration of the valve body 1 is illustrated. One can see here in particular the monotonous decrease of the envelope surface 2 from the first plateau region 3 to the base region 7. One can also see that the geometric configuration of the valve body 1 as substantially free of material interruptions enables its simple and inexpensive manufacture by means of thermoforming or deep drawing from a film (e.g. polytetrafluoroethylene). During the course of manufacture, the weakened region 5 can also be produced at the valve body 1 as a targeted material-weakened region.

Figure 3:
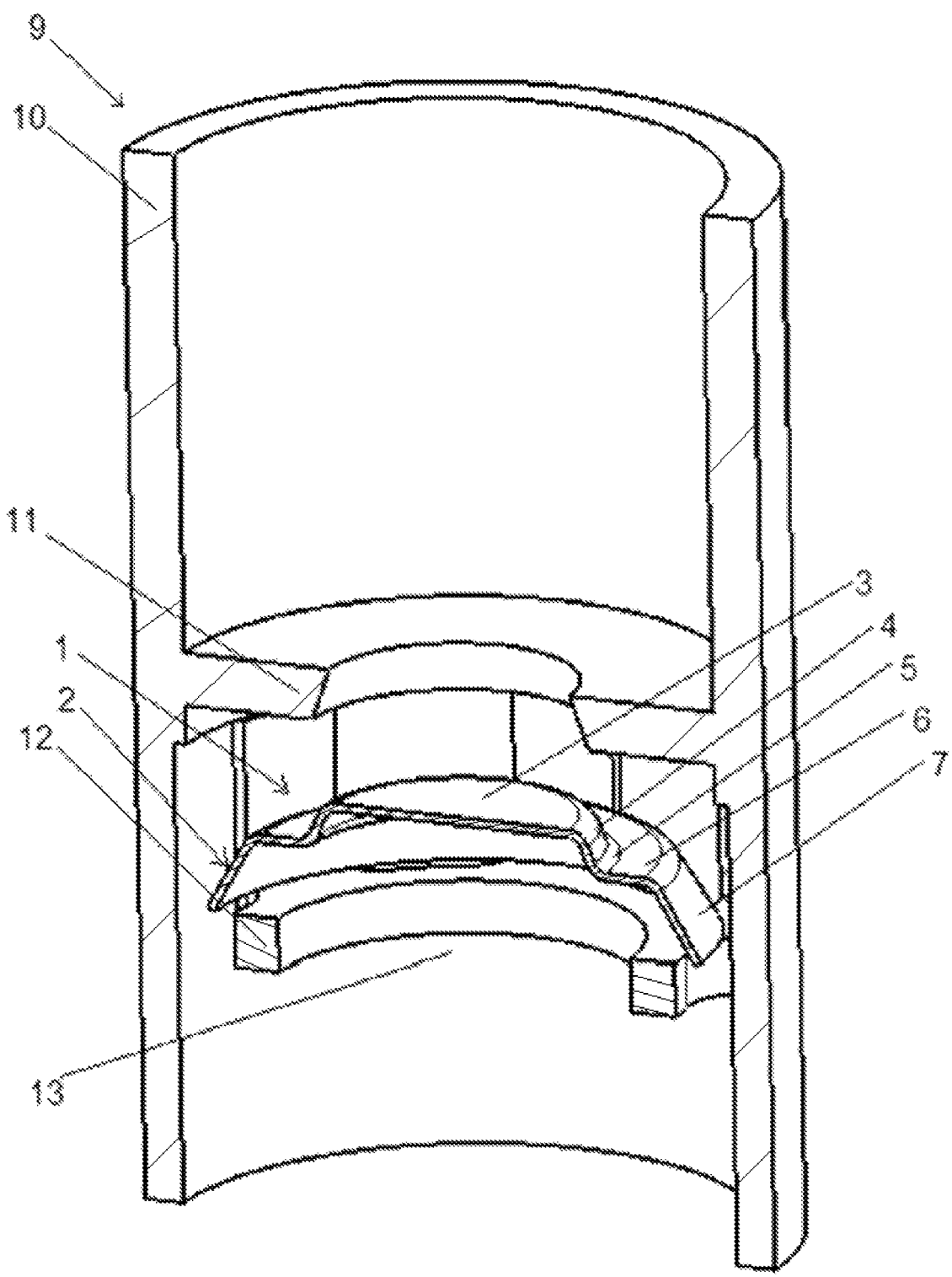
FIG. 3 shows an isometric illustration of a valve with the valve body.

In FIG. 3, the valve body 1 according to the first embodiment is then shown in a valve 9 according to the invention. The valve 9 comprises a valve housing 10 and a valve seat 11. The valve body 1 is positioned on a valve body holder 12 with an axial end of the base region 7. The valve 9 is illustrated in an open state. The valve body holder 12 serves, on the one hand, for centering the valve body 1 in the valve 9. This enables, on the one hand, a permanent centering of the valve body 1 in relation to the valve seat 11. On the other hand, it also enables centering of the valve body 1 for all conceivable installation positions of the valve 9 that comprises the valve body 1; centering can be achieved for vertical or horizontal or other installation positions in relation to the direction of the force of gravity. On the other hand, the valve body 1 is secured against loss and reliably held within the valve 9.

The distance between the valve body holder 12 and the valve seat 11 represents the stroke of the valve 9 or of the valve body 1. In a closed state of the valve 9, the sealing region 4 contacts fluid-tightly the valve seat 11. Then, the first plateau region 3 closes the opening of the valve seat 11. The second plateau region 6 contacts the valve seat 11. In this way, a "pulling through" of the valve body 1 through the valve seat 11 can be avoided even for relatively large vacuum values. The weakened region 5 is embodied completely around the circumference of the sealing region 4. In this way, an intrinsically springy region in the valve body 1 is provided that permits a relative movement of sealing region 4 to the base region 7 in the axial direction of the valve body 1. Thus, by means of the valve body 1, essentially a "second intrinsic stroke" for the valve 9 is provided. Closing of the valve 9 can be realized already at very minimal vacuums and, in reverse, opening of the valve can be realized already at very minimal oil quantity weights for drainage purposes. A flow opening 13 in the valve body holder 12 also serves for improvement of drainage.

Figure 4:
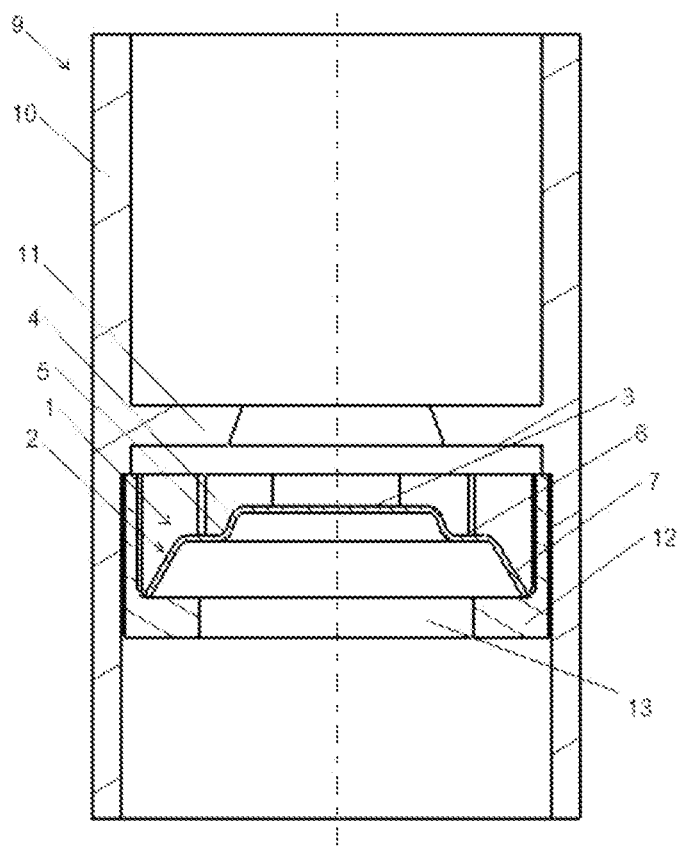
FIG. 4 shows a section illustration of the valve with the valve body.

In FIG. 4, the valve 9 is illustrated in a section illustration. Here one can see in particular that the valve body holder 12 can be connected, for example, by welding to the valve housing 10, for example, by ultrasonic welding.

What is claimed is:

1. A valve comprising:
    a valve housing;
    a valve seat arranged in the valve housing;
    a valve body holder arranged in the valve housing and comprising at least one fluid-permeable flow opening;
    a valve body arranged in the valve body holder in the valve housing, wherein the entire valve body is configured to be axially displaced between an open state of the valve and a closed state of the valve;
    wherein the valve body comprises an envelope surface that comprises a sealing region configured to fluid-tightly contact the valve seat in the closed state of the valve and further comprises a base region adjoining the sealing region in a longitudinal direction of the valve body;
    wherein a cross-section contour of the envelope surface increases monotonously from the sealing region to the base region;
    wherein, in the open state of the valve, an axial end of the base region arranged opposite the sealing region contacts the valve body holder;
    wherein the envelope surface further comprises a weakened region connecting the sealing region and the base region to each other;
    wherein the weakened region comprises a reduced stiffness in relation to the longitudinal direction of the valve body;
    wherein the valve body is formed of a valve body material comprising a thermoplastic polyhalogen olefin.

2. The valve according to claim 1, wherein the polyhalogen olefin is a polytetrafluoroethylene; the polytetrafluoroethylene comprising one or more admixtures selected from a fluoro admixture, a carbon admixture, and an oxygen admixture; or a thermoplastically processed polytetrafluoroethylene.

3. The valve according to claim 1, wherein the weakened region, at least in sections thereof, is embodied together with the sealing region and the base region so as to be free of material interruptions and is embodied circumferentially in a circumferential direction of the sealing region.

4. The valve according to claim 3, wherein the reduced stiffness of the weakened region is at least partially influenced by at least one material parameter of the valve body material.

5. The valve according to claim 4, wherein the reduced stiffness of the weakened region is influenced by a reduced modulus of elasticity of the valve body material in the weakened region.

6. The valve according to claim 1, wherein the reduced stiffness of the weakened region is at least partially influenced by at least one material parameter of the valve body material.

7. The valve according to claim 6, wherein the reduced stiffness of the weakened region is influenced by a reduced modulus of elasticity of the valve body material in the weakened region.

8. The valve according to claim 1,
    wherein the valve body comprises a first plateau region arranged on a side of the sealing region facing away from the weakened region,
    wherein the envelope surface comprises a second plateau region arranged between the weakened region and the base region,
    wherein the first plateau region and the second plateau region are parallel to each other.

9. The valve according to claim 8,
    wherein the valve body comprises one or more first pressure compensation openings,
    wherein the one or more first pressure compensation openings connect an inner side of the valve body with an outer side of the valve body,
    wherein the one or more first pressure compensation openings extend in a radial direction of the valve body from the weakened region across the second plateau region at least partially into the base region.

10. The valve according to claim 9,
    wherein the valve body comprises one or more second pressure compensation openings,
    wherein the one or more second pressure compensation openings connect the inner side with the outer side,
    wherein the one or more second pressure compensation openings are arranged between two neighboring ones of the first pressure compensation openings, respectively, and extend in the radial direction of the valve body from an axial end of the base region in a direction toward the second plateau region.

11. The valve according to claim 1, wherein a thickness of the cross-section contour is in a range of $\frac{1}{10}$ mm to 1 mm.

12. The valve according to claim 11, wherein the range of the thickness of the cross-section contour is $\frac{1}{10}$ mm to $\frac{5}{10}$ mm.

13. The valve according to claim 12, wherein the range of the thickness of the cross-section contour is $\frac{3}{10}$ mm to $\frac{5}{10}$ mm.

14. A crankcase ventilation device comprising at least one valve according to claim 1.

* * * * *